May 2, 1967 D. L. EMMONS 3,317,843

PROGRAMMABLE FREQUENCY DIVIDER EMPLOYING TWO CROSS-COUPLED MONOSTABLE MULTIVIBRATORS COUPLED TO RESPECTIVE INPUTS OF A BISTABLE MULTIVIBRATOR

Filed Feb. 1, 1966 2 Sheets-Sheet 1

INVENTOR.
DAVID L. EMMONS
BY Julian C. Renfro
ATTORNEY

May 2, 1967 D. L. EMMONS 3,317,843

PROGRAMMABLE FREQUENCY DIVIDER EMPLOYING TWO CROSS-COUPLED MONOSTABLE MULTIVIBRATORS COUPLED TO RESPECTIVE INPUTS OF A BISTABLE MULTIVIBRATOR

Filed Feb. 1, 1966

2 Sheets-Sheet 2

INVENTOR.
DAVID L. EMMONS

BY Julian C. Renfro
ATTORNEY

United States Patent Office 3,317,843

Patented May 2, 1967

3,317,843

PROGRAMMABLE FREQUENCY DIVIDER EMPLOYING TWO CROSS-COUPLED MONOSTABLE MULTIVIBRATORS COUPLED TO RESPECTIVE INPUTS OF A BISTABLE MULTIVIBRATOR

David L. Emmons, Orlando, Fla., assignor to Martin-Marietta Corporation, Middle River, Md., a corporation of Maryland Filed Feb. 1, 1966, Ser. No. 524,192
8 Claims. (Cl. 328—41)

The present invention relates to a simplified frequency dividing circuit and more particularly to an electronic circuit for dividing an input frequency by a divisor to produce a lower output frequency.

Usual prior art devices for dividing frequencies employ either single or cascaded multivibrators. A one-shot or monostable multivibrator can be adjusted to an input pulse train that is a multiple of the multivibrator period. Assume that the monostable multivibrator has a period timed for every fourth input pulse. For every four input pulses there is one output pulse. Therefore, if a 200 kc. pulse series is applied to the input of this multivibrator, the output frequency is 50 kc. If the 50 kc. signal is passed through yet another monostable multivibrator in which the output frequency is one-fifth the input frequency an output of 10 kc. is obtained. In this manner, one-shot multivibrators are used as frequency dividers. One-shot multivibrators, however, produce nonsymmetrical pulse trains, and are not suitable for many applications. Further, the decay and restoration time of the multivibrators must be sufficiently rapid to avoid interference with succeeding triggering pulses.

To obtain symmetrical pulses bistable multivibrators can be used singly or connected in tandem. A bistable multivibrator works in a flip-flop or set-reset manner in which each bistable multivibrator divides by two. The bistable multivibrators are connected in tandem until the correct divisor is reached. A gating circuit may be required to obtain an odd divisor and a one-shot multivibrator may be needed for producing a rectangular output pulse of the desired width. The chief disadvantage with using bistable multivibrators in this way is the lack of flexibility n changng the divisor.

The present frequency divider is a simplified circuit which has the flexibility of being able to select the desired divisor by a control input voltage. It can divide by a relatively wide range of divisors and is limited only by the characterstics of the monostable multivibrators used in the circuit. A symmetrical output pulse series is produced.

The same principles used in frequency dividers also are used in pulse counting applications. The pulses to be counted are passed through a series of multivibrator circuits. Each group of multivibrators is known as a decade counter and provides one pulse output for each ten pulses applied to the input. The final output is then applied to a mechanical counter which displays the count in a multiple of the actual count, such as in hundreds or thousands. Accordingly, the present invention may also be used in pulse counting applications.

The present invention provides for an electronic pulse divider or counting circuit which may have input and output lines, two monostable multivibrators which are adapted to receive input pulses from the input line, and a bistable multivibrator which is adapted to receive pulses from the output from each monostable multivibrator. Each monostable multivibrator may receive inhibiting pulses from the output of the other monostable multivibrator and from one output of the bistable multivibrator so that only one of the two monostable multivibrators can be triggered and run at a time. The output line receives pulses from only one output of the bistable multivibrator.

Other objects, features, and advantages of this invention will be apparent from a study of the written description and the drawings in which.

Figure 1:
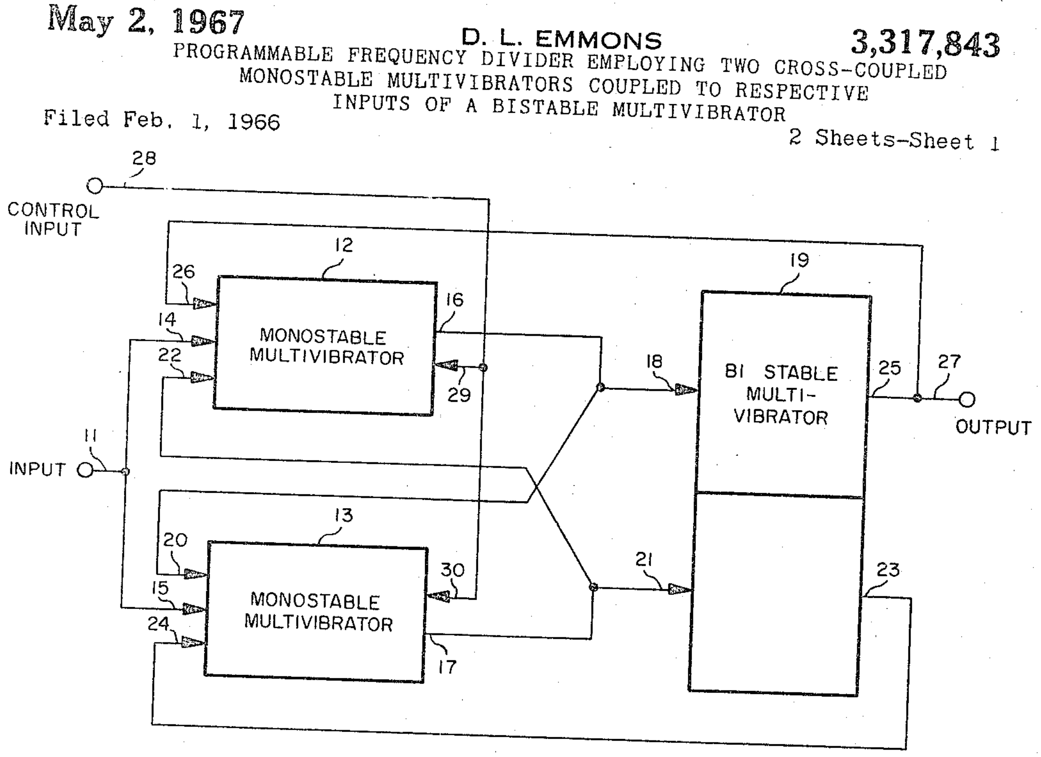
FIGURE 1 is a block diagram of a preferred embodiment of the present invention.

Referring to FIGURE 1 an example of the present invention is shown with two monostable multivibrators 12 and 13, and one bistable multivibrator 19. A monostable or one-shot multivibrator has only one condition of steady-state equilibrium in which the circuit can remain for an indefinite period of time. There is also one condition of momentary equilibrium in which the circuit remains for a finite period of time. Each time a triggering pulse is applied, the circuit first switches to the momentary equilibrium condition and then, after a finite period of time reverts to the original condition and remains in this condition until another pulse is applied. In a bistable multivibrator there are two steady-state equilibrium conditions. Unless some external voltage unbalances the circuit, it remains in either of these two equilibrium conditions indefinitely. An input line 11 is shown connected to the monostable or one-shot multvibrators 12 and 13 at inputs 14 and 15 respectively. Input pulses or signals may trigger the monostable multivibrators to a condition of momentary equilibrium from a state of steady equilibrium, which then generates pulses at their outputs 16 and 17. The output 16 from multivibrator 12 is connected to an input 18 of a bistable multivibrator 19 and to the input 20 of multivibrator 13. Similarly, the output 17 from multivibrator 13 is connected to the input 21 of the bistable multivibrator 19 and to the input 22 of multivibrator 12. Bistable multivibrator 19 has output 23 which is connected to input 24 of multivibrator 13, and output 25 is connected to input 26 of multivibrator 12 and to output line 27. The preferred embodiment has a control input line 28 connected to inputs 29 and 30 of multivibrators 12 and 13 respectively for controlling the timing period of the one-shot multivibrators 12 and 13. Having a separate control input line for each monostable multivibrator whereby adjustments can be made for minor variations in the multivibrators is also contemplated as being within the scope of the present invention.

Figure 2:
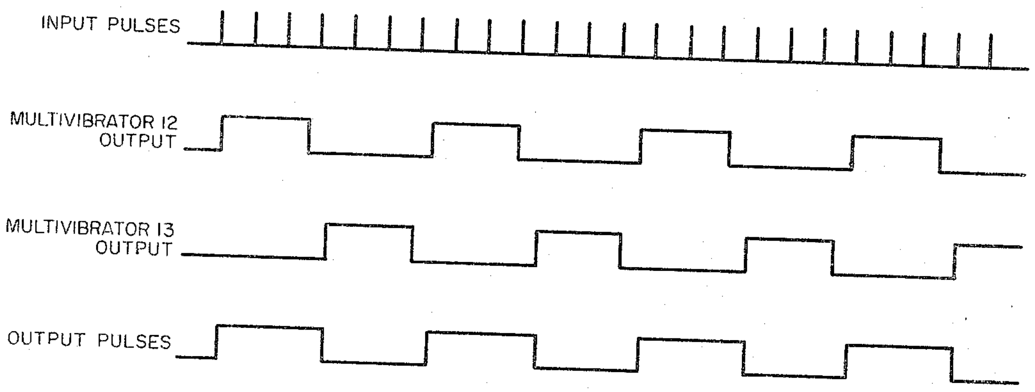
FIGURE 2 shows the pulse relationship of pulses at various stages in the circuit.

Referring to FIGURES 1 and 2, the circuit receives input pulses at input line 11 which are fed to the inputs 14 and 15 of multivibrators 12 and 13. If the bistable multivibrator 19 is in a condition of steady equilibrium with the output 23 running then an inhibiting signal will be produced at input 24 of multivibrator 13. This inhibiting signal will prevent the input pulses from triggering multivibrator 13. Monostable multivibrator 12, however, will be triggered from its steady state equilibrium to its state of momentary equilibrium. The pulse from multivibrator 12 (FIGURE 2) is fed to the input 20 of multivibrator 13 where it acts as an inhibiting pulse to prevent the triggering of the multivibrator 13 while multivibrator 12 is in its momentary state of equilibrium. This is necessary since the pulse from multivibrator 12 is also fed to the bistable multivibrator 25 and shifts it to its other state of steady equilibrium with an output at 25. When multivibrator 12 returns to its steady state equilibrium, the next input pulse will trigger multivibrator 13 since the inhibiting pulse of the bistable multivibrator has shifted and now is being fed to input 26 of multivibrator 12. Multivibrator 13 produces an inhibiting pulse to the input 22 of multivibrator 12 and also shifts the bistable multivibrator 19, but again to a steady state condition with output at 23. The output pulses being produced at 27 can be seen in FIGURE 2 which has divided the input pulse train by 6. Altering the timing period or time in the state of momentary equilibrium of the multivibrator 12 and 13 by a control voltage from the control input line 28 changes the divisor.

Figure 3:
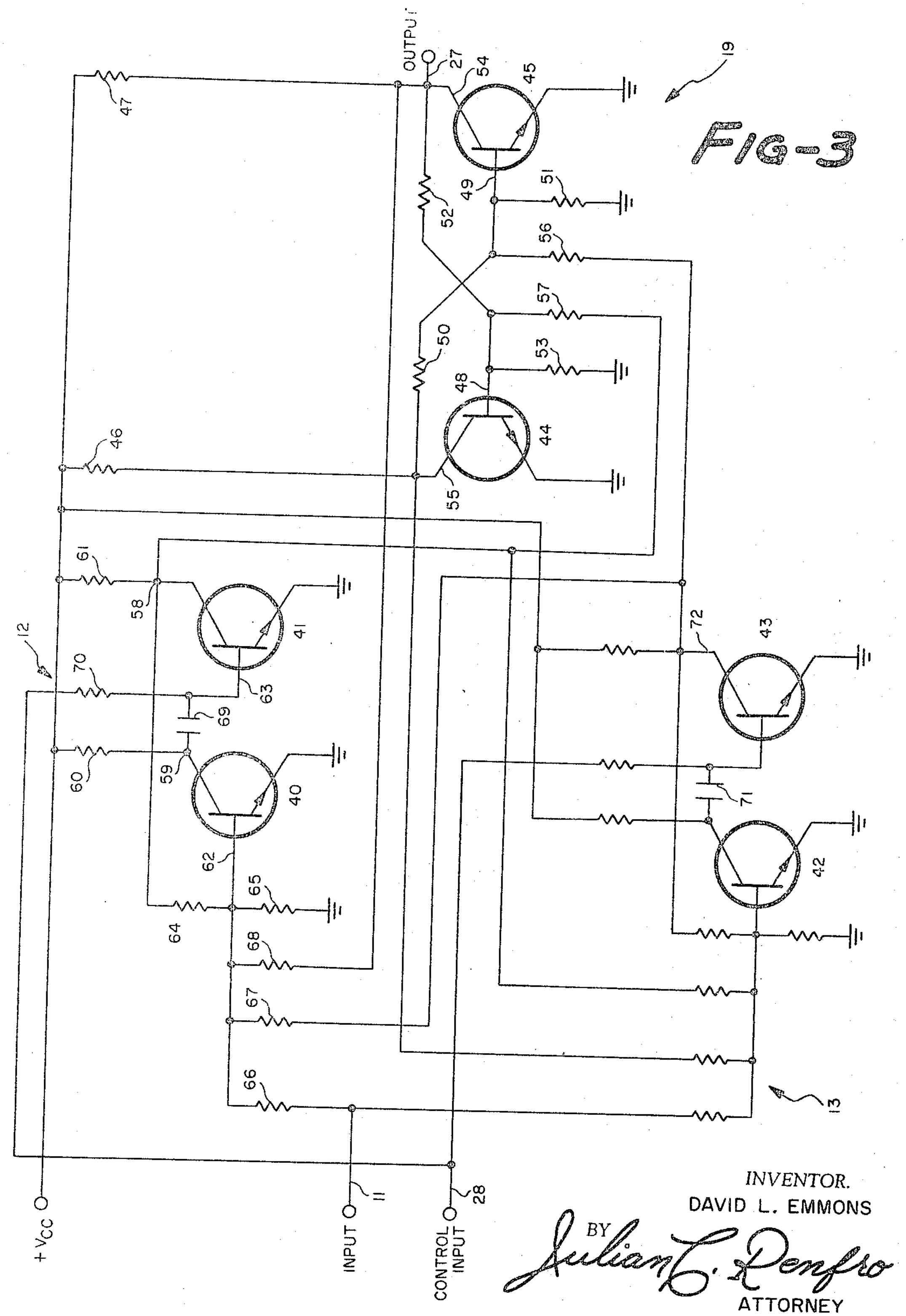
FIGURE 3 is a schematic diagram of the embodiment of FIGURE 1.

In FIGURE 3 the blocks in FIGURE 1 have been replaced with schematic diagrams of well known multivibrator circuits. The bistable multivibrator 19 consists of two transistors 44, 45 each with emitter, collector and base electrodes. The transistors are connected together to form a closed loop with negative feedback. Each transistor has its emitter connected to ground with a $+V_{CC}$ voltage placed on its collector through isolating resistors 46 and 47. The bases 48, 49 are biased by the $+V_{CC}$ source through voltage dropping resistors 50, 52 and voltage dividing resistors 51, 53.

Transistors 44 and 45 have stable and cutoff positions, and triggering pulses will cause them to shift ther states from 44 saturated and 45 cutoff, to 44 cutoff and 45 saturated. When transistor 44 is saturated, a triggering pulse must be applied (through resistor 56) to base 49 of transistor 45 to cause a shift in the multivibrator's state. The pulse saturates transistor 45 and the feedback from collector 54 to base 48 of transistor 44 cuts off of transistor 44.

When transistor 45 is saturated, its collector voltage drops and the voltage at collector 55 of transistor 44, which is cut off, rises. In this way a shift takes place between the states of equilibrium of multivibrator 19. A triggering pulse through resistor 57 to base 48 of transistor 44 causes a shift back to the original state in the same manner just described. Output line 27 is connected to collector 54.

Turning now to monostable multivibrator 12, a well known circuit is shown which consists of two transistors 40 and 41 each with emitter, collector and base electrodes. The multivibrator has a stable state in which transistor 41 is saturated and thereby maintaining a low voltage at the collector 58, and a momentary state in which transistor 41 is cutoff creating a high voltage at the collector electrode 58.

Each transistor has its emitter connected to ground and has a $+V_{CC}$ voltage placed on its collector through isolating resistors 60 and 61. The base 62 of transistor 40 is biased through voltage dropping resistor 64 and voltage dividing resistor 65.

If a positive voltage is placed on base 62 through resistors 66, 67 and 68, transistor 40 becomes saturated which lowers the voltage at collector electrode 59. Capacitor 69 which is charged up to the $+V_{CC}$ voltage will discharge through transistor 40 on one side and through resistor 70 on the other. The discharge of capacitor 69 places a negative voltage on the base 63 of transistor 41 and cuts off the transistor until the negative voltage has discharged sufficiently that transistor 41 can again become saturated. In normal multivibrator operation transistor 40 will then cut off and capacitor 69 will quickly recharge to the $+V_{CC}$ voltage. However, if a positive voltage is maintained on base 62, transistor 40 will remain saturated and capacitor 69 will be unable to recharge. Thus, both transistors 40 and 41 remain saturated. In this way a positive pulse can be made to inhibit a monostable multivibrator.

A D.C. voltage at control input 28 will affect the rate of discharge of capacitor 69 and consequently the duration of the pulse produced at the output of the multivibrator.

Monostable multivibrator 13 operates in the same manner as just described for multivibrator 12.

In operation bistable multivibrator 19 is set with transistor 45 cut off and transistor 44 saturated. This produces a voltage at the collector 54 of transistor 45 and thereby at the base 62 of transistor 40 and keeps the transistor 40 saturated. An input pulse being received at input 11 does not affect transistor 40 but will saturate transistor 42 of multivibrator 13 which allows capacitor 71 to discharge, cutting off transistor 43 and producing a voltage at collector 72 and at base 49 of transistor 45. This shifts the state of the bistable multivibrator 19. The output at collector 72 of transistor 43 also places a voltage on base 62 of transistor 40 which maintains transistor 40 in its saturated condition. When capacitor 71 of multivibrator 13 has discharged sufficiently, transistor 43 again becomes saturated but transistor 42 is maintained in the saturated state by the now shifted bistable multivibrator. Thus, capacitor 71 cannot recharge. When the voltage at collector 72 drops, transistor 40 will no longer be maintained in a saturated condition and will be cut off momentarily while capacitor 69 recharges. The next incoming pulse at input 11 will now trigger multivibrator 12 and starts the operation over.

Although the circuit of FIGURE 3 is shown as using an NPN type transistor, a PNP type of transistor may be utilized if the polarities of the various voltages are reversed. Equivalent vacuum tube circuits, relay circuits or other multivibrator means including pneumatic or mechanical devices might also be utilized in place of the transistor circuit.

From the foregoing description it will be clear that a simplified frequency divider circuit has been provided, which may be used in dividing and counting operations. It is to be understood that other variations are contemplated as being within the spirit of the invention. For instance, instead of the positive feedback voltages from the bistable and monostable multivibrators, an inverter placed at the output of each monostable multivibrator would provide negative inhibiting pulses. The circuit also can be connected in tandem with similar circuits or with bistable or monostable multivibrators to increase the divisor.

This invention is not to be construed as limited to the particular forms disclosed herein, since these are to be regarded as illustrative rather than restrictive.

I claim:

1. A frequency divider circuit comprising:

(a) input and output lines;

(b) two monostable multivibrators for receiving input pulses from the input line and generating output pulses;

(c) bistable multivibrator for receiving pulses from said monostable multivibrators and producing output pulses;

(d) each said monostable multivibrator connected to receive inhibiting pulses from the output of the other said monostable multivibrator and from one output of said bistable multivibrator whereby only one of said two monostable multivibrators can be triggered and run at a time;

(e) said output line operable to receive pulses from only one output of said bistable multivibrator.

2. The circuit according to claim 1 but including two control input lines, each connected to one of said monostable multivibrators whereby control voltages may be used to change the timing of said monostable multivibrators.

3. The circuit according to claim 2 in which said control input lines are connected together whereby one control voltage may be used to change the timing of both monostable multivibrators simultaneously.

4. An electronic frequency divider circuit comprising:

(a) input and output lines:

(b) first and second monostable multivibrators, each having a first, second and third input means and an output circuit:

(c) bistable multivibrator having first and second input means and first and second output circuits;

(d) said input line connected to the first input circuit of said first and second monostable multivibrator, whereby an input triggering pulse can be fed to said first and second monostable multivibrator;

(e) the output circuit of said first monostable multivibrator being connected to the first input means of said bistable multivibrator and to the second input means of said second monostable multivibrator;

(f) the output circuit of said second monostable multivibrator being connected to the second input means of said bistable multivibrator and to the second input means of said first monostable multivibrator;

(g) said first output circuit of said bistable multivibrator connected to said third input means of said first monostable multivibrator, and to said output line;

(h) said second output circuit of said bistable multivibrator connected to said third input means of said second monostable multivibrator;

(i) whereby said bistable multivibrator will allow an input pulse to initially trigger only one monostable multivibrator at a time, and once triggered, said monostable multivibrator will provide an output pulse to the input of the other monostable multivibrator to prevent triggering of said other monostable multivibrator while said one monostable multivibrator is running.

5. The circuit according to claim 4 wherein asid first and second monostable multivibrators each have a fourth input means for receiving control pulses whereby the timing period of said first and second monostable multivibrators may be changed remotely.

6. The circuit according to claim 5 in which said fourth input means of said first and second monostable multivibrators are connected together whereby the timing period of said first and second monostable multivibrators may be changed simultaneously.

7. A frequency dividing circuit comprising:

(a) input and output means;

(b) first and second monostable multivibrators each having a condition of steady state equilibrium and a conditon of momentary equilibrium;

(c) a bistable multivibrator having two conditions of steady state equilibrium and operable to shift between said conditions of equilibrium when voltages are applied thereto;

(d) said first monostable multivibrator producing a voltage at said second monostable multivibrator and at said bistable multivibrator when asid first monostable multivibrator is in a condition of momentary equilibrum;

(e) said second monostable multivibrator producing a voltage at said first monostable multivibrator and at said bistable multivibrator when said second monostable multivibrator is in a condition of momentary equilibrium;

(f) said bistable multivibrator producing a voltage at said first monostable multivibrator when said bistable multivibrator is in one condition of steady state equilibrium and at said second monostable multivibrator when said bistable multivibrator is in another condition of steady state equilibrium;

(g) said input means connected to said first and second monostable multivibrators whereby input voltages are adapted to trigger said first or second monostable multivibrators;

(h) whereby said first monostable multivibrator is prevented from shifting from a condition of steady state equilibrium to a condition of momentary equilibrium when a voltage is applied thereto by either said bistable multivibrator or said second monostable multivibrator and said second monostable multivibrator is prevented from shifting from a condition of steady state equilibrium to a condition of momentary equilibrium when a voltage is applied thereto by either said bistable multivibrator or said first monostable multivibrator; and (i) said output means is operable to receive a voltage from said bistable multivibrator when said bistable multivibrator is in one condition of steady state equilibrium.

8. The circuit according to claim 7 in which said first and second monostable multivibrators have a control input means whereby a control voltage may be applied to said first and second monostable multivibrators to change the period of time said first and second monostable multivibrators remain in a condition of momentary equilibrium.

References Cited by the Examiner

UNITED STATES PATENTS

| | | | |
|---|---|---|---|
| 2,830,179 | 4/1958 | Stenning | 328—39 X |
| 2,931,981 | 4/1960 | Schabauer | 228—55 |
| 3,125,691 | 3/1964 | Astheimer | 307—88.5 |

ARTHUR GAUSS, *Primary Examiner.*

J. HEYMAN, *Assistant Examiner.*